United States Patent
Yokoyama

(10) Patent No.: US 7,218,337 B2
(45) Date of Patent: *May 15, 2007

(54) OPTICAL SCANNER, OPTICAL-PATH ADJUSTMENT METHOD, AND IMAGE FORMING APPARATUS

(75) Inventor: Masato Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 10/663,782

(22) Filed: Sep. 17, 2003

(65) Prior Publication Data

US 2004/0104993 A1 Jun. 3, 2004

(30) Foreign Application Priority Data

Sep. 19, 2002 (JP) .............................. 2002-273785

(51) Int. Cl.
*B41J 27/00* (2006.01)
(52) U.S. Cl. ...................... 347/241; 347/256
(58) Field of Classification Search ................ 347/116, 347/119, 233–235, 241–245, 248–250, 256–261, 347/229–231, 234–236, 244

See application file for complete search history.

(56) References Cited

U.S. PATENT DOCUMENTS

| | | | |
|---|---|---|---|
| 4,847,642 A * | 7/1989 | Murayama et al. .......... | 347/116 |
| 5,212,501 A * | 5/1993 | Nakamura et al. .......... | 347/259 |
| 5,321,483 A | 6/1994 | Yokoyama et al. | |
| 5,719,684 A | 2/1998 | Ohkaji et al. | |
| 5,799,229 A | 8/1998 | Yokoyama et al. | |
| 5,878,317 A | 3/1999 | Masuda et al. | |
| 5,946,529 A | 8/1999 | Sato et al. | |
| 6,353,455 B1 * | 3/2002 | Ozaki et al. ................ | 347/236 |
| 6,493,010 B1 * | 12/2002 | Takahashi et al. .......... | 347/116 |

(Continued)

FOREIGN PATENT DOCUMENTS

JP    60-133415    7/1985

(Continued)

OTHER PUBLICATIONS

U.S. Appl. No. 09/374,133, filed Aug. 10, 1999, unknown.

(Continued)

*Primary Examiner*—Hai Pham
(74) *Attorney, Agent, or Firm*—Oblon, Spivak, McClelland, Maier & Neustadt, P.C.

(57) ABSTRACT

An optical scanner includes a light source which emits a light beam, a reflection mirror which has a reflection surface, a first axis parallel to a main-scanning direction, and a second axis along the reflection surface and perpendicular to the first axis, and an optical element which adjusts a position of a scanning line in a sub-scanning direction, the optical element having a beam-incidence surface, a third axis parallel to the main-scanning direction on the beam-incidence surface, and a fourth axis perpendicular to the third axis and along a beam-incidence direction. A first adjustment unit is provided to rotate the reflection mirror around the second axis in order to attain uniformity of a scanning speed. A second adjustment unit is provided to rotate the optical element around the fourth axis in order to correct an inclination of the scanning line to a desired position of the scanning line.

19 Claims, 10 Drawing Sheets

U.S. PATENT DOCUMENTS

| | | |
|---|---|---|
| 6,587,137 B2 | 7/2003 | Shinohara et al. |
| 6,593,951 B2 | 7/2003 | Yokoyama et al. |
| 6,719,469 B2 | 4/2004 | Yasui et al. .................. 400/603 |
| 6,864,906 B2 * | 3/2005 | Yokoyama .................. 347/119 |
| 2002/0192000 A1 | 12/2002 | Yasui et al. |

FOREIGN PATENT DOCUMENTS

| | | | |
|---|---|---|---|
| JP | 1-183676 | | 7/1989 |
| JP | 9-292580 | | 11/1997 |
| JP | 10-221618 | | 8/1998 |
| JP | 10221618 A | * | 8/1998 |
| JP | 11153765 A | * | 6/1999 |
| JP | 2000-275555 | | 10/2000 |
| JP | 2001-117033 | | 4/2001 |
| JP | 2001117033 A | * | 4/2001 |
| JP | 2001-228427 | | 8/2001 |
| JP | 2002-116397 | | 4/2002 |

OTHER PUBLICATIONS

U.S. Appl. No. 09/375,988, filed Aug. 16, 1999, unknown.
U.S. Appl. No. 10/218,471, filed Aug. 14, 2002, Yasui et al.
U.S. Appl. No. 09/330,669, filed Jun. 11, 1999, unknown.
U.S. Appl. No. 10/247,644, filed Sep. 20, 2002, Yoshizawa.
U.S. Appl. No. 10/663,782, filed Sep. 17, 2003, Yokoyama.
U.S. Appl. No. 10/893,391, filed Jul. 19, 2004, Yokoyama et al.
U.S. Appl. No. 10/857,019, filed Jun. 1, 2004, Tomita et al.

* cited by examiner

OPTICAL SCANNER, OPTICAL-PATH ADJUSTMENT METHOD, AND IMAGE FORMING APPARATUS

BACKGROUND OF THE INVENTION

1. Field of the Invention

The present invention relates to an optical scanner which irradiates a light beam to a scanned surface of an image support to form an electrostatic latent image on the image support surface, and an optical-path adjustment method which is used for the optical scanner, and an image forming apparatus which includes the optical scanner provided therein.

2. Description of the Related Art

The electrophotographic image forming apparatuses, such as copiers, printers, facsimiles, plotters, etc. are known. Each of these image forming apparatuses is provided with an optical scanner which irradiates a light beam to a scanned surface of an image support to form the electrostatic latent image on the image support surface.

These image forming apparatuses may be classified into four major types which follow.

(1) The monochrome image forming apparatus in which the light beam which is emitted by a light source is irradiated to an image support (for example, a photoconductive drum) to form an electrostatic latent image on the image support surface, the latent image formed on the image support is converted into the visible image by the developer (for example, the toner of black), the visible image is transferred to a recording material (for example, paper) by using a transferring unit, and after the transferring the image is fixed to the recording material by using a fixing unit.

(2) The color image forming apparatus in which the light beam which is emitted by a light source is irradiated to an image support (for example, a photoconductive drum) to form an electrostatic latent image on the image support surface, the latent image formed on the image support is converted into the visible images by two or more developers of different colors (for example, the toners of yellow, magenta, cyan, and black), the visible images of the different colors are combined by using a primary transferring unit, the multi-color image after the primary transferring is transferred to a recording material (for example, paper) by using a secondary transferring unit, and after the secondary transferring the multi-color image is fixed to the recording material by using a fixing unit.

(3) The color image forming apparatus in which the light beams which are emitted by plural light sources are irradiated to plural image supports (for example, photoconductive drums) to form electrostatic latent images on the image support surfaces, the latent images formed on the image supports are converted into the visible images by two or more developers of different colors (for example, the toners of yellow, magenta, cyan, and black), the visible images of the different colors are combined and transferred to a recording material (for example, paper) by transporting the recording material to the respective transfer units of the image supports by means of a transfer conveyance belt, and after the transferring the multi-color image is fixed to the recording material by using a fixing unit.

(4) The color image forming apparatus in which the light beams which are emitted by plural light sources are irradiated to plural image supports (for example, photoconductive drums) to form electrostatic latent images on the image support surfaces, the latent images formed on the image supports are converted into the visible images by two or more developers of different colors (for example, the toners of yellow, magenta, cyan, and black), the visible images of the different colors are combined by using a primary transferring unit, the multi-color image after the primary transferring is transferred to a recording material (for example, paper) by transporting the recording material to the respective transfer units of the image supports by means of a transfer conveyance belt and a secondary transferring unit, and after the secondary transferring the multi-color image is fixed to the recording material by using a fixing unit.

In the optical scanner provided for the optical writing in each of the image forming apparatuses, the following deviating conditions may take place:

A. The resist deviation in the sub-scanning direction (or the counterpart) (FIG. 13A)
B. The scanning line inclination in the sub-scanning direction (or the counterpart) (FIG. 13B)
C. The scanning line bending in the sub-scanning direction (or the counterpart) (FIG. 13C)
D. The resist deviation in the main scanning direction (or the counterpart) (FIG. 13D)
E. The scale-factor deviation in the main scanning direction (or the counterpart) (FIG. 13E)
F. The non-uniformity of the scanning speed in the main scanning direction (or the counterpart) (FIG. 13F)

The main scanning direction is the direction in which the optical scanner performs the optical writing to the image support, and the sub-scanning direction is the direction in which the recording material is moved. Hereinafter, it is supposed that the sub-scanning direction is substantially perpendicular to the main scanning direction.

Although the optical writing direction and the movement direction of the recording material are at right angles mechanically, the recording material is moved in the sub-scanning direction while it is scanned in the main scanning direction. Strictly speaking, the image in the main scanning direction and the image in the sub-scanning direction are not perpendicular to each other.

Moreover, the intermediate position on the optical path prior to entering the recording material does not correspond to the main scanning direction and the sub-scanning direction. Hereinafter, the direction that corresponds to the main scanning at the position of the optical writing on the optical path is called the main scanning correspondence direction, and the direction that corresponds to the sub-scanning at the position of the optical writing on the optical path is called the sub-scanning correspondence direction.

The resist deviation in the sub-scanning direction of the item A above is a shifting of the scanning line from the ideal scanning line in parallel with the sub-scanning direction as shown in FIG. 13A. This phenomenon arises due to changes of the sub-scanning-direction performance of the optical elements and the geometric precision of each optical element, caused by thermal expansion of each optical element.

The scanning line inclination in the sub-scanning direction of the item B above is an inclination of the scanning line from the ideal scanning line in the sub-scanning direction as shown in FIG. 13B. This phenomenon arises due to changes of the sub-scanning-direction performance of the optical elements and the geometric precision of each optical element.

The scanning line bending in the sub-scanning direction of the item C above is a bending of the scanning line to the ideal scanning line in the sub-scanning direction as shown in FIG. 13C. This phenomenon arises due to changes of the sub-scanning-direction performance of the optical elements, the geometric precision of each optical element, and the deformation of each optical element.

The resist deviation in the main scanning direction of the item D above is a shifting of the scanning start position between respective scanning lines as shown in FIG. 13D. This phenomenon arises due to a small variation of the laser diode wavelength during the multi-beam scanning, the difference of the field inclination of the multiple surfaces of the polygon mirror, the difference of the quantity of light in several modes of image formation, etc.

The scale-factor deviation in the main scanning direction of the item E above is a phenomenon in which the lengthes of the scanning lines differ in the main scanning direction from the ideal length as shown in FIG. 13E. This phenomenon arises due to changes of the sub-scanning-direction performance of the optical elements and the geometry precision of each optical element, caused by thermal expansion of each optical element. Moreover, it is generated by a small variation of the laser diode wavelength in the multi-beam scanning or the like.

The non-uniformity of the scanning speed in the main scanning direction of the item F above is a phenomenon in which the optical writing of the light beam is not suitably performed at the ideal scanning position because the scanning speed in the main scanning direction varies microscopically. This phenomenon arises due to changes of the main-scanning-direction performance of the optical elements and the geometry precision of each optical element, caused by thermal expansion of each optical element.

In order to obviate the sub-scanning-direction resist deviation of the item A above, the correction of the position relation of the optical scanner and the paper end is performed by adjusting the emission start timing of the light source with respect to the sub-scanning direction. There is no necessity for high precision adjustment of the optical scanner. It is adequate that the optical scanner adjustment is performed in a range that does not cause interference with the main part component members by heat deformation etc.

However, the color image forming apparatuses of the types (3) and (4) above need the detection units for setting the scanning start timing of the optical scanners of the respective colors. These detection units detect the light beam or the pixel position.

To obviate the scanning-line inclination in the sub-scanning direction of the item B above, the necessary scanning line inclination characteristics are obtained with the precision of the optical scanner component parts in the image forming apparatus which does not need the positional precision so much as in the monochrome image forming apparatus of the type (1) above.

Moreover, in the image forming apparatus which needs the comparatively high position precision, parallelism adjustment is carried out in the attachment portions with the optical scanner, and the inclination characteristics of the reproduced image are obtained.

In the case of the optical scanner provided in the image forming apparatus of the types (3) and (4) above, inclination adjustment of the optical scanner and parallelism adjustment with the optical scanner are carried out according to the scanning inclination adjustment mechanism which changes the position of the reflection mirror around the axis that is perpendicular to the main scanning direction and at right angles to the reflection surface of the mirror.

To obviate the scanning line bending in the sub-scanning direction of the item C above, the necessary scanning line bending characteristics are obtained with the precision of the optical scanner component parts in the image forming apparatus which does not need the positional precision so much as in the image forming apparatuses of the types (1) and (2) with the single optical path.

In the case of the optical scanner provided in the image forming apparatus which needs the comparatively high positional precision, for example, the types (3) and (4) with the multiple optical paths, the central part of the optical element with the function to correct the position of the scanning line in the sub-scanning direction is deformed, and thereby the scanning line bending in the sub-scanning direction is adjusted.

To obviate the resist deviation in the main scanning direction of the item D above, fundamentally, the optical detection unit including the photodiodes is provided in the optical scanner or the main part of the optical scanner at the location that is outside the image formation area. The scanning start position of the main scanning direction is determined by forming image information by the optical scanning based on the time which indicates the passing of the light beam detected by the optical detection unit.

To obviate the deviation of the scanning start position due to variations of the field inclinations of the plural surfaces of the polygon mirror, the component part precision is raised to a level which does not appear in the reproduced image.

Moreover, to obviate the difference of the quantity of light in the several image formation modes and the small variation of LD wavelength by the multi-beam scanning, the scanning start timing is controlled according to the quantity of light in each image formation mode.

To obviate the scale-factor deviation in the main scanning direction of the item E above, the necessary scale-factor characteristics are obtained with the precision including the thermal expansion of the optical scanner component parts in the image forming apparatus which does not need the positional precision so much as in the monochrome image forming apparatus of the type (1).

Moreover, in the image forming apparatus which needs the comparatively high positional precision, two separate optical detection units including the photodiodes are provided in the optical scanner or the main part of the optical scanner at the scanner start and end locations that are outside the image formation area. The scale factor is calculated based on the ratios of the times, the passing of the light beam is detected by the two optical detection units, to the reference time, the drawing frequency is changed according to the calculation result so as to accord with the reference time, so that the adjustment of the scale factor in the main scanning direction is carried out.

Moreover, in the color image forming apparatus of the types (3) and (4), the deviation of the scale factor between the respective optical paths directly causes the picture degradation such as the color deviation. When the optical element with the function to correct the position of the scanning line in the main scanning direction is made of a resin material with which the index of refraction of the optical element significantly changes by temperature, the two optical detection units mentioned above are indispensably needed.

To obviate the non-uniformity of the scanning speed in the main scanning direction of the item F above, the necessary scanning-speed uniformity is obtained with the precision including the thermal expansion of the optical scanner component parts in the image forming apparatus which does not need the positional precision so much as in the monochrome image forming apparatus of the type (1).

Moreover, in the color image forming apparatus which does not need the absolute position precision as that of the type (2), the same optical path is used for each color, and there is no difference of scanning-speed uniformity. Therefore the countermeasure that is essentially the same as in the image forming apparatus of the type (1) is taken.

Moreover, in the high precision plotter which needs the absolute position precision as in the types (1) and (2), and in the color image forming apparatus of the types (3) and (4), the different optical paths in the optical scanner are used for the respective colors. The drawing frequency is changed and adjusted within the time of the main scanning in such image forming apparatuses.

It is difficult to obtain the continuous change microscopically, and the undesired line image may be produced by the dot pitch irregularity in the main scanning direction.

When the optical element with the function to correct the position of the scanning line in the main scanning direction is made of a resin material with which the index of refraction of the optical element significantly changes by temperature, the scanning-speed uniformity of the main scanning direction is determined by the distribution of temperature within the optical element. In order to obviate the non-uniformity of the scanning speed in the main scanning direction, it is necessary to have many drawing cycle patterns with the optical scanner.

Thus, the adjustment techniques to obviate the positional deviations of the items A to E above are mostly established as described above. On the other hand, when the resin optical element is used in the optical scanner, it is necessary to carry out the adjustment for obviating the scanning-speed non-uniformity of the item F above with high precision, in order to avoid the picture degradation. However, in the current circumstances, the method for adjusting the scanning-speed non-uniformity with adequately high precision is not established yet, and it is difficult to avoid the picture degradation for the case of the optical scanner in which the resin optical element is used.

SUMMARY OF THE INVENTION

An object of the present invention is to provide an improved optical scanner in which the above-described problems are eliminated.

Another object of the present invention is to provide an optical scanner with a single optical path which attains good scanning-speed uniformity and high absolute-position precision, as well as an optical scanner with multiple optical paths which attains good scanning-speed uniformity between the optical paths and high absolute-position precision.

Another object of the present invention is to provide an optical-path adjustment method which attains easy adjustment of one or more optical paths of light beams for an optical scanner which is of either the single optical path or the multiple optical paths.

Another object of the present invention is to provide an image forming apparatus which is provided with the above-mentioned optical scanner and can provide good quality of reproduced image.

The above-mentioned objects of the present invention are achieved by an optical scanner optical scanner which irradiates a light beam to a scanned surface of an image support to form an electrostatic latent image on the image support surface, comprising: a light source emitting a light beam; at least one reflection mirror having a reflection surface, a first axis parallel to a main-scanning correspondence direction on the reflection surface, and a second axis along the reflection surface and perpendicular to the first axis; an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction; a first adjustment unit provided to rotate the at least one reflection mirror around the second axis in order to attain uniformity of a scanning speed of the optical scanner in the main scanning direction; and a second adjustment unit provided to rotate the optical element around the fourth axis in order to correct an inclination of the scanning line in the sub-scanning correspondence direction to a desired position of the scanning line.

The above-mentioned objects of the present invention are achieved by an optical-path adjustment method for an optical scanner which irradiates a light beam to a scanned surface of an image support to form an electrostatic latent image on the image support surface, the optical scanner including: a light source emitting a light beam; at least one reflection mirror having a reflection surface, a first axis parallel to a main-scanning correspondence direction on the reflection surface, and a second axis along the reflection surface and perpendicular to the first axis; and an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction, the method comprising the steps of: rotating the at least one reflection mirror around the second axis in order to attain uniformity of a scanning speed of the optical scanner in the main scanning direction; and rotating the optical element around the fourth axis in order to correct an inclination of the scanning line in the sub-scanning correspondence direction to a desired position of the scanning line, wherein the second rotating step is performed after the first rotating step is performed.

The above-mentioned objects of the present invention are achieved by an image forming apparatus comprising: an optical scanner which irradiates a light beam to a scanned surface of an image support to form an electrostatic latent image on the image support surface; and an image formation unit forming an image on a recording material based on the electrostatic latent image formed on the image support surface, the optical scanner comprising: a light source emitting a light beam; at least one reflection mirror having a reflection surface, a first axis parallel to a main-scanning correspondence direction on the reflection surface, and a second axis along the reflection surface and perpendicular to the first axis; an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction; a first adjustment unit provided to rotate the at least one reflection mirror around the second axis in order to attain uniformity of a scanning speed of the optical scanner in the main scanning direction; and a second adjustment unit provided to rotate the optical element around the fourth axis in order to correct an inclination of the scanning line in the sub-scanning correspondence direction to a desired position of the scanning line.

According to the present invention, it is possible to provide with a single optical path which attains good scanning-speed uniformity and high absolute-position precision.

It is also possible to provide an optical scanner with multiple optical paths which attains good scanning-speed uniformity between the optical paths and high absolute-position precision.

According to the present invention, it is possible to provide an optical-path adjustment method which attains easy adjustment of one or more optical paths of light beams for an optical scanner which is of either the single optical path or the multiple optical paths.

According to the present invention, it is possible to provide an image forming apparatus which is provided with the above-mentioned optical scanner and can provide good quality of reproduced image.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Figure 1:
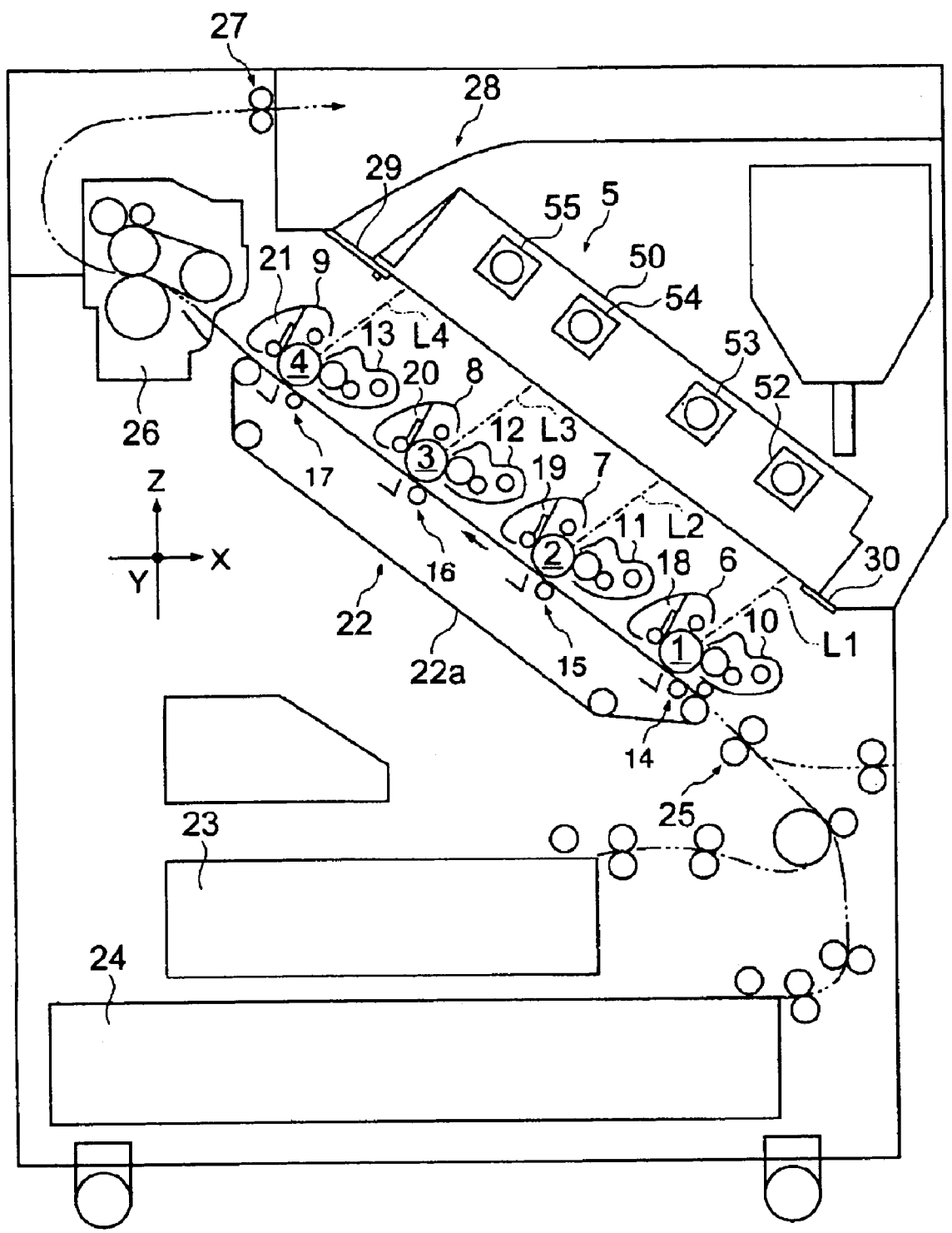
FIG. 1 is a diagram showing the outline composition of an image forming apparatus to which one embodiment of the optical scanner of the present invention is applied.
Figure 2:
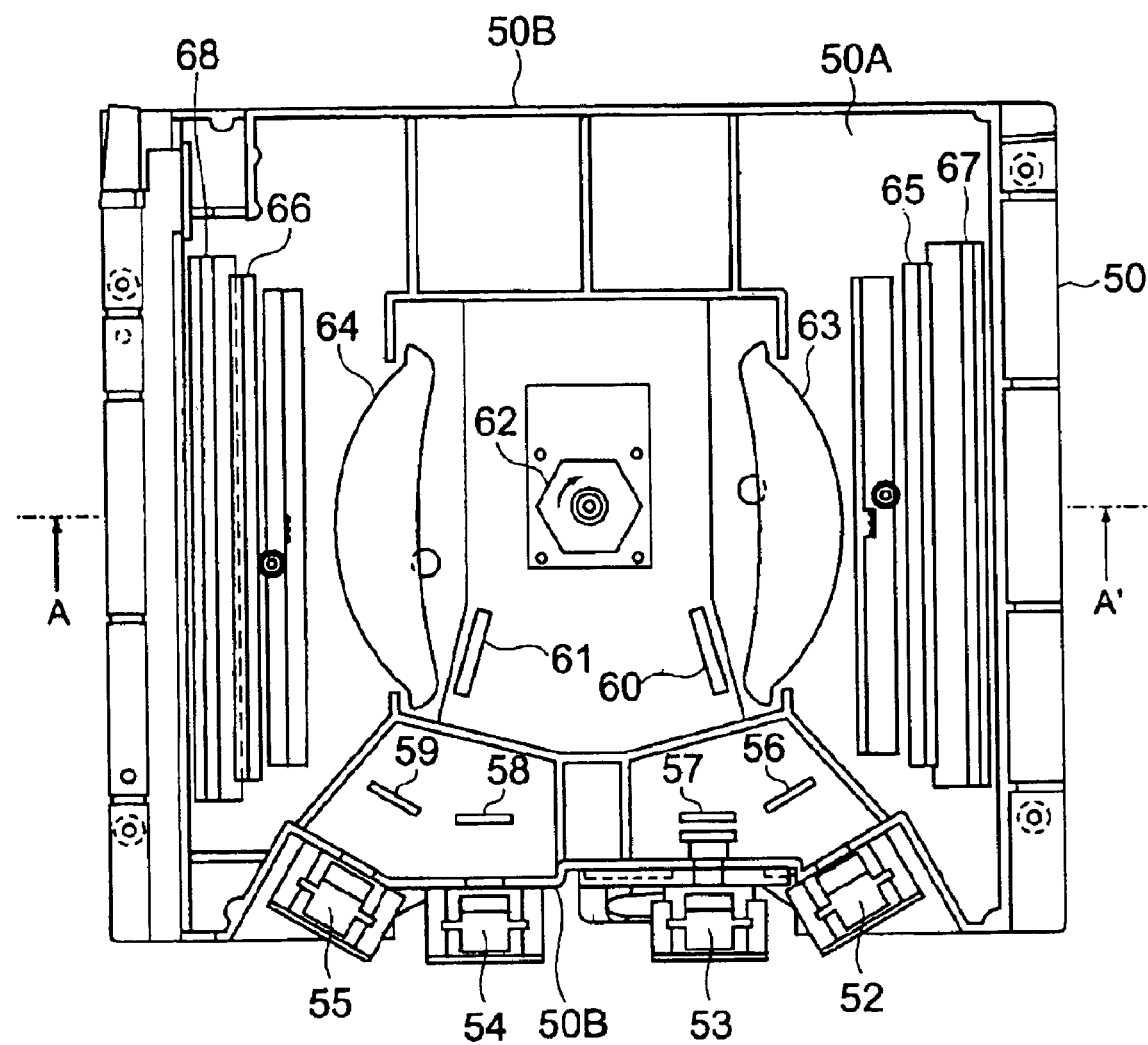
FIG. 2 is a top view of the optical scanner in the image forming apparatus of FIG. 1.
Figure 3:
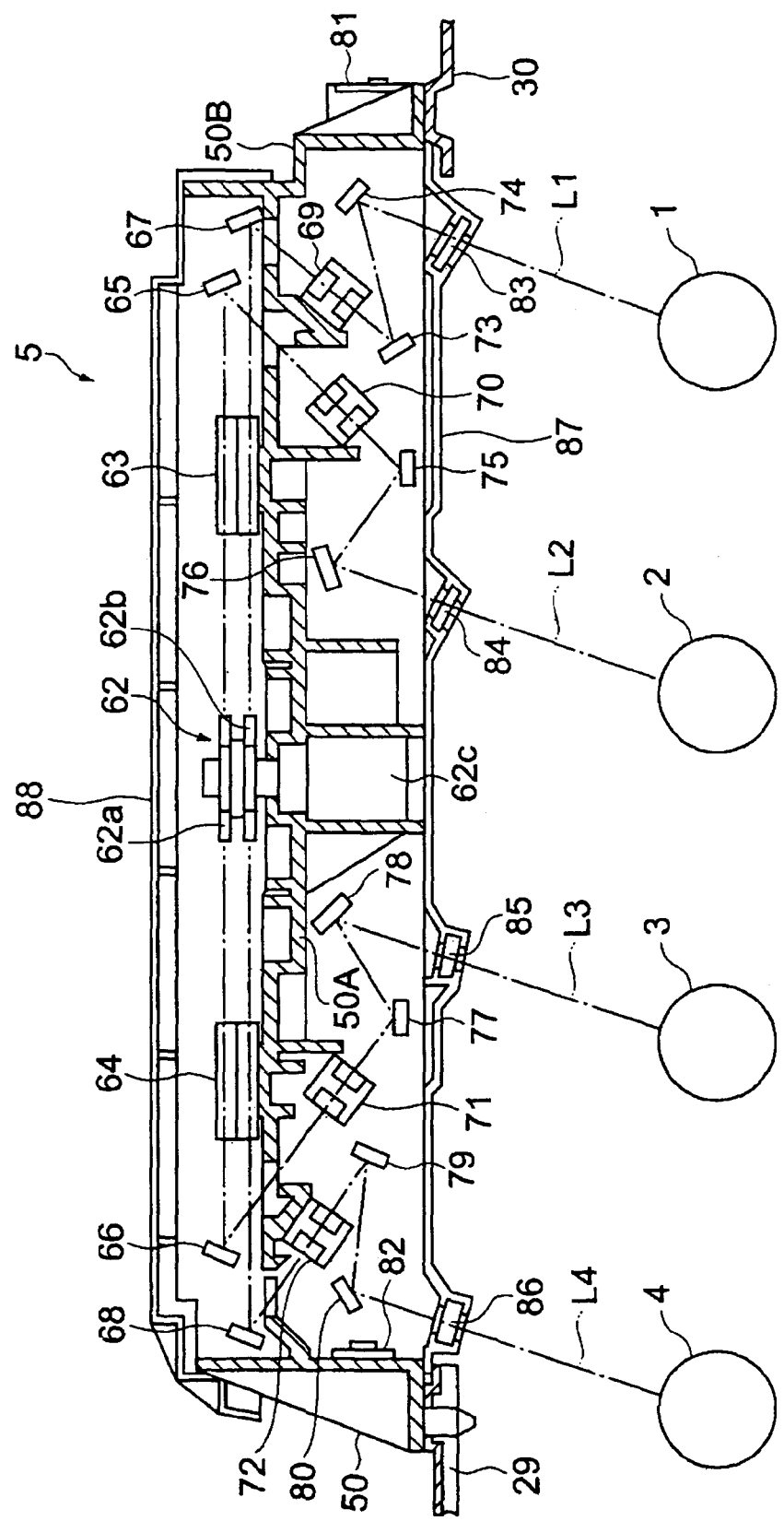
FIG. 3 is a cross-sectional view of the optical scanner taken along the line A–A' indicated in FIG. 2.

FIG. 1 shows the outline composition of an image forming apparatus to which one preferred embodiment of the optical scanner of the present invention is applied. FIG. 2 shows the composition of the optical scanner provided in the image forming apparatus of FIG. 1. FIG. 3 is cross-sectional view of the optical scanner taken along the line A–A' indicated in FIG. 2.

Figure 4:
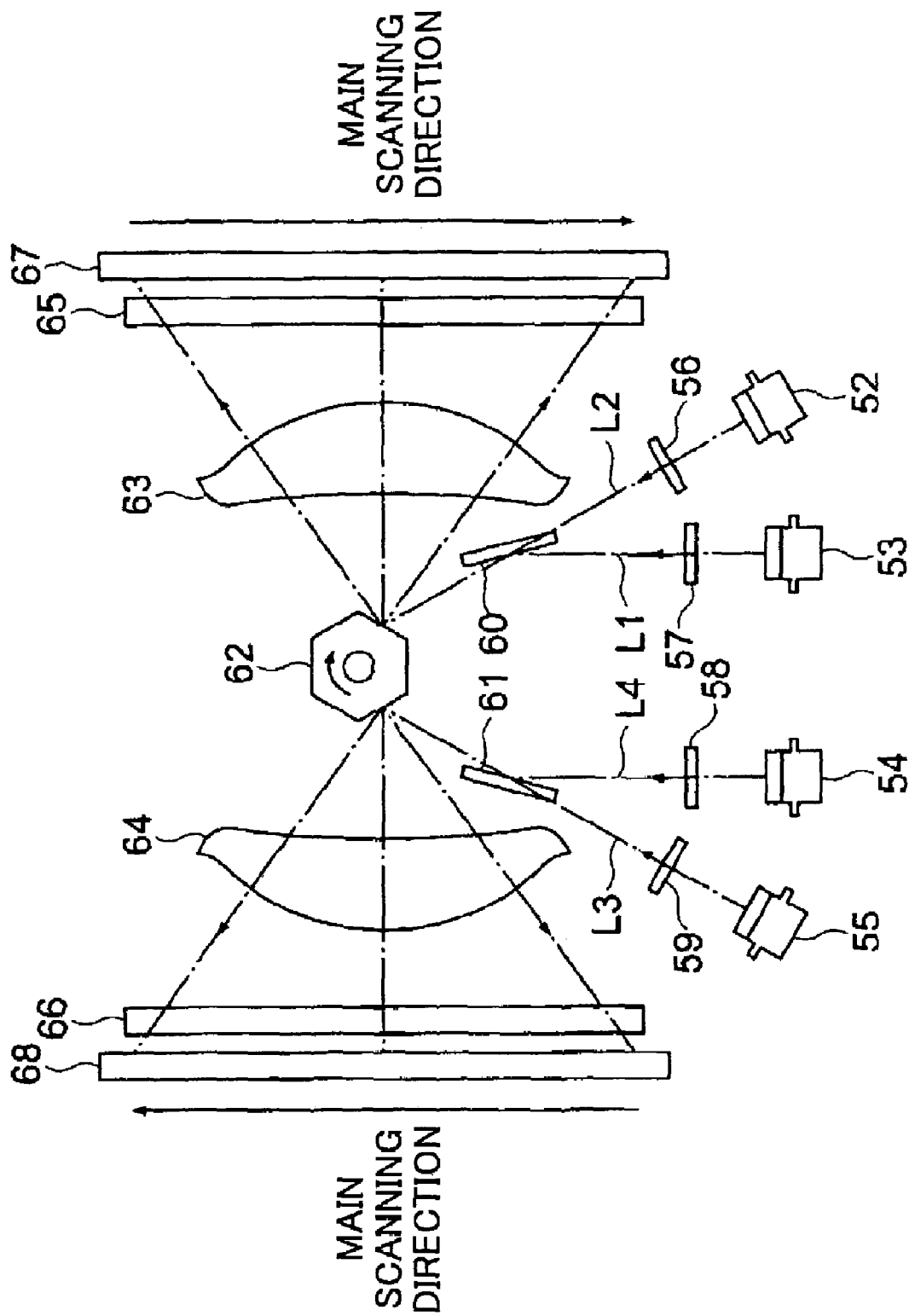
FIG. 4 is a diagram for explaining the arrangement of a light source unit, an optical deflector and an optical system in the optical scanner of FIG. 2.
Figure 5:
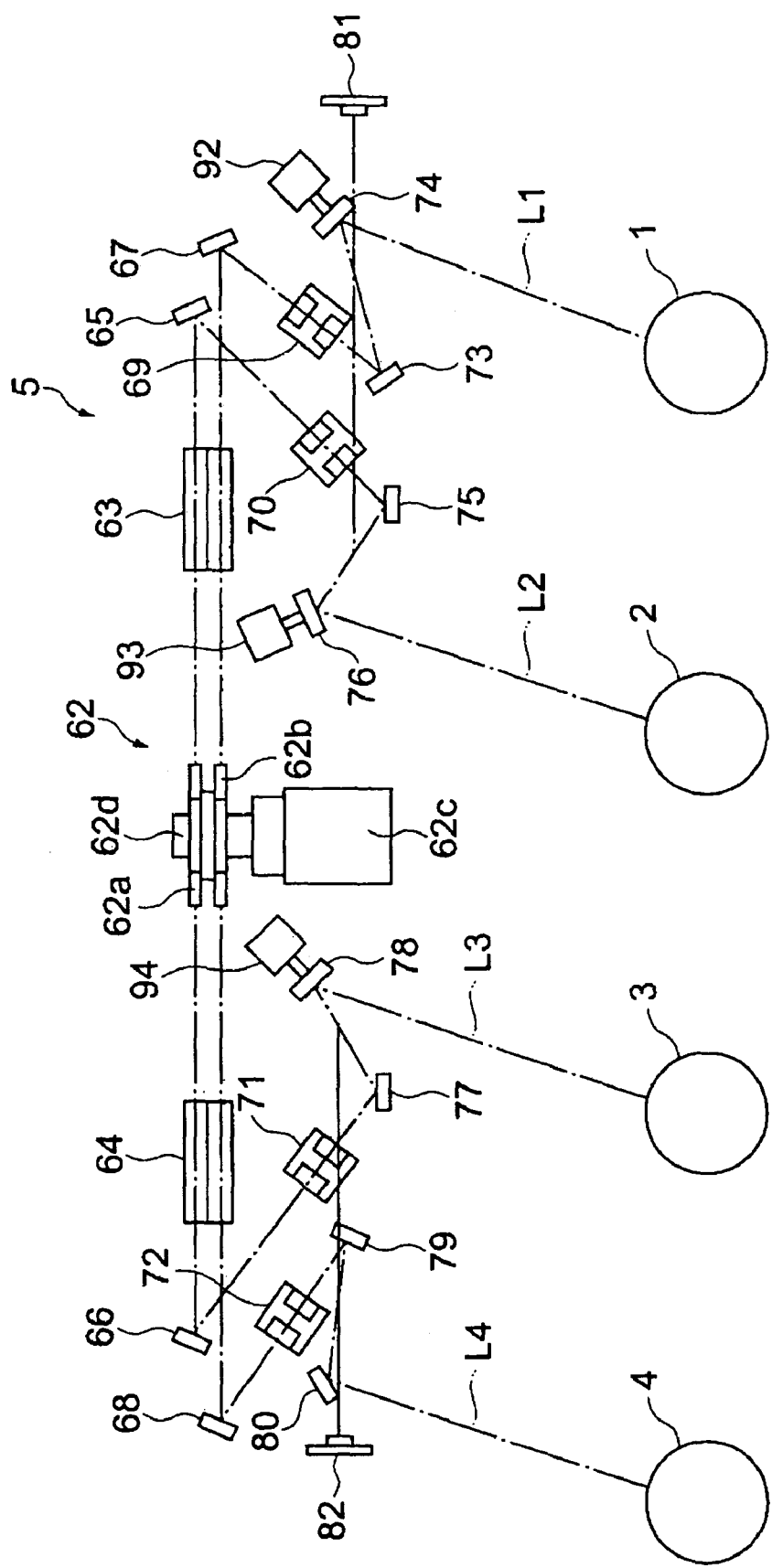
FIG. 5 is a diagram for explaining the arrangement of the optical deflector and the optical system in the optical scanner of FIG. 3.

FIG. 4 is a diagram for explaining the arrangement of a light source unit, an optical deflector and an optical system in the optical scanner of FIG. 2. FIG. 5 is a diagram for explaining the arrangement of the optical deflector and the optical system in the optical scanner of FIG. 3.

In FIG. 1, the image forming apparatus is a full color image forming apparatus (printer) in which a plurality of drum-shape electrostatic photoconductive media (called the photoconductive drums) 1, 2, 3 and 4, acting as a plurality of image supports, are arranged in parallel. For example, the four photoconductive drums 1, 2, 3, and 4 respectively correspond to the colors of black (BK), cyan (C), magenta (M), and yellow (Y) in the order from the right to the left on the drawing of FIG. 1. Electrostatic latent images corresponding to the four colors are formed on the photoconductive drums 1, 2, 3, and 4, respectively. In addition, the order of colors is not limited to this embodiment, and it may be arbitrarily set up according to the image forming apparatus composition.

In order to carry out the electrophotographic process of image formation, the charging units 6, 7, 8, and 9 (each including the charging roller, the charging brush, the charger, etc.), the exposure positions of light beams L1, L2, L3, and L4 from the optical scanner 5, the development units (the developing devices of the colors of BK, C, M, and Y) 10, 11, 12, and 13, the transfer transport device 22, including the transfer conveyance belt 22a and the transfer units 14, 15, 16, and 17 (each including the transfer roller, the transfer brush, etc.) on the back side of the belt 22a, and the cleaning units 18, 19, 20, and 21 (each including the cleaning blade, the cleaning brush, etc.) are arranged around the periphery of each of the photoconductive drums 1, 2, 3, and 4, respectively.

With the above-mentioned composition, it is possible to perform the image formation of the latent images of the colors on the photoconductive drum 1, 2, 3, and 4.

In FIG. 1, it is supposed that the arrow Z indicates the upward vertical direction of the image forming apparatus, and the arrows X and Y indicate the two orthogonal horizontal directions of the image forming apparatus.

The direction of the side-by-side installation of the four photoconductive drums 1, 2, 3, and 4 is inclined to the horizontal plane. In the composition of FIG. 1, the installation direction is inclined to the horizontal direction of X.

The transfer transport device 22 is arranged in parallel with the side-by-side installation direction of the photoconductive drums 1, 2, 3, and 4, and the installation direction of the transfer transport device 22 is also inclined to the horizontal plane. The copy sheet (paper) is fed from the lower part side of the inclination direction, and it is transported to the upper part side of the inclination direction by the transfer conveyance belt 22a to pass through the four photoconductive drums 1, 2, 3, and 4 sequentially.

The image forming apparatus includes the paper cassettes 23 and 24. Each of the paper cassettes 23 and 24 contains a plurality of copy sheets. The copy sheet taken out from one of the paper cassettes 23 and 24 is fed by the feed rollers 25 to the imaging section where the photoconductive drums 1, 2, 3, and 4 are arranged side by side.

The fixing device 26 is arranged at the downstream location in the direction of transport of the copy sheet, which corresponds to the upper part side of the inclination direction mentioned above. The copy sheet, after the fixing of the image is carried out with the heat and pressure of the fixing device 26, is transported to the ejection location 28 by the ejection rollers 27.

The optical scanner 5 is arranged at the location that is slantingly upward from the imaging section where the photoconductive drums 1, 2, 3, and 4 are arranged side by side. The housing 50 of the optical scanner 5 is arranged in parallel with the side-by-side installation direction of the photoconductive drums 1, 2, 3, and 4, and the installation direction of the housing 50 is also inclined to the horizontal plane (the horizontal direction of X). The housing 50 is secured to the inclined frames 29 and 30 of the main part of the image forming apparatus.

As shown in FIG. 2 through FIG. 5, the optical scanner 5 includes four light source units 52, 53, 54 and 55, an optical deflector 62, and an optical system. The optical deflector 62 distributes the light beams L1, L2, L3, and L4 from the light source units 52, 53, 54, and 55 in the two symmetrical directions from the center of the optical deflector 62, and carries out the deflection scanning of the light beams L1, L2, L3 and L4, as shown in FIG. 4.

In the optical scanner 5, the optical system contains optical members including the focusing lenses 63, 64, 69, 70, 71 and 72, and the optical-path reflection mirrors 65, 66, 67, 68, 73, 74, 75, 76, 77, 78, 79 and 80. The optical system is configured symmetrically in the two directions about the center of the optical deflector 62. The optical system leads the deflected light beams L1, L2, L3, and L4 from the optical deflector 62 and focuses them onto the scanned surfaces of the photoconductive drums 1, 2, 3 and 4 where the optical writing is carried out. These component parts are contained in the housing 50 of the optical scanner 5.

The housing 50 includes the base plate 50A in which the optical deflector 62 and the optical system are arranged, and the frame-shape side wall 50B surrounding the circumstance of the base plate 50A. The base plate 50A is arranged at the central part of the side wall 50B so as to divide the inside of the housing 50 into the upper and lower partitions.

The four light source units 52, 53, 54 and 55 are arranged on the side wall 50B of the housing 50 almost in parallel with the side-by-side installation direction of the photoconductor drums. The optical deflector 62 is arranged almost at the central part of the base plate 50A of the housing 50.

The optical members (including the focusing lenses 63, 64, 69, 70, 71 and 72, and the reflection mirrors 65, 66, 67, 68, 73, 74, 75, 76, 77, 78, 79 and 80) of the optical system of the optical scanner 5 are divided into two groups and arranged on the both sides (the upper surface side and the lower surface side) of the base plate 50A.

Moreover, the upper cover 88 and the lower cover 87 are arranged on the upper part and the lower part of the housing 50 respectively. The lower cover 87 is provided with the apertures which pass the light beams L1, L2, L3 and L4, and the dust-proof glasses 83, 84, 85 and 86 are attached to the apertures respectively.

In the optical scanner 5, the color-separated image data which are inputted from the document reading device (the scanner) or the image data output units (the personal computer, the word processor, and the facsimile receiving unit, etc.), which are not illustrated, are transformed into the driving signals for the light source units 52, 53, 54 and 55. The semiconductor lasers (LD) of the light source units 52, 53, 54 and 55 are driven in accordance with the driving signals received, and they emit the laser light beams.

The light beams emitted by the light source units 52, 53, 54 and 55 are sent to and pass through the field-correction cylindrical lenses 56, 57, 58 and 59 respectively. The light beams from the cylindrical lenses 56, 57, 58 and 59 are sent to the optical deflector 62 directly or through the reflection of the mirrors 60 and 61. In the optical deflector 62, the two polygon mirrors, which are rotated at uniform velocity around the shaft 62d by the polygon motor 62c, serves to carry out the deflection scanning of the incoming light beams L1, L2, L3 and L4 in the two symmetrical directions.

In the embodiment of FIG. 2 or FIG. 5, the optical deflector 62 is provided with the polygon mirror 62a for the light beams L2 and L3, and the polygon mirror 62b for the light beams L1 and L4. Alternatively, the optical deflector 62 may be configured to have a single thick polygon mirror that is suitably arranged to carry out the deflection scanning of the four light beams collectively.

The light beams from the polygon mirrors 62a and 62b of the optical deflector 62 after the deflection scanning is performed for the two directions are sent to pass through the focusing lenses 63 and 64, each including, for example, the two-layered f θ lens, respectively.

The light beams from the focusing lenses 63 and 64 are reflected by the first reflection mirrors 65, 66, 67, and 68, and the reflected light beams pass through the openings of the base plate 51. The light beams from the openings of the base plate 51 are sent to pass through the second focusing lenses 69, 70, 71 and 72, each including, for example, the wide toroidal lens, respectively. Then, the light beams through the second focusing lenses 69, 70, 71 and 72 are reflected twice by the second reflection mirrors 73, 75, 77 and 79 and by the third reflection mirrors 74, 76, 78 and 80, and they pass through the apertures of the housing of the optical scanner 5.

The scanned surfaces of the photoconductive drums 1, 2, 3 and 4 for the respective colors are irradiated by the light beams through the second reflection mirrors 73, 75, 77 and 79, the third reflection mirrors 74, 76, 78 and 80, and the dust-proof glass 83, 84, 85 and 86, and the electrostatic latent images are formed on the scanned surfaces of the photoconductive drums.

In the above-described optical scanner 5, the four light source units 52, 53, 54 and 55 include the semiconductor lasers (LD) as the light sources, and the collimator lenses which collimate the outgoing beams of the semiconductor lasers, and these component parts are contained in the holder of the corresponding light source unit. Incidentally, the light source unit for black (for example, the light source unit 54), which is used frequently at the time of monochrome image formation, may be configured in the multi-beam composition containing the group of plural light sources (LD) and collimator lenses, in order to enable high-speed optical writing.

Moreover, when the light source unit is configured in the multi-beam composition and the light source unit is supported on the side wall 50B of the housing 50 rotatably around the optical-axis center thereof, the beam pitch of the light source unit in the sub-scanning direction can be adjusted, and it is possible to change the optical density of pixels (the resolution) (for example, 600 dpi, 1200 dpi, etc.) at the time of monochrome image formation.

Furthermore, the mirrors (not shown) for synchronous detection are provided for taking out the light beam of the scanning starting position in the main scanning direction are provided in the optical paths of the light beams L1, L2, L3 and L4, and the light beams reflected by the synchronous detection mirrors are received at the synchronous detectors 81 and 82, and the sync signals indicating the scanning start timing are outputted by the detectors 81 and 82.

In addition, the scanning direction in which the deflection scanning of the light beams is carried out by the optical deflector 62 corresponds to the main scanning direction of the optical scanner 5, and this direction is parallel to the axial directions of the photoconductive drums 1–4 of the image forming apparatus. The direction which is perpendicular to the main scanning direction corresponds to the sub-scanning direction of the optical scanner 5 (in this embodiment, the rotating direction of the photoconductive drums 1–4, and generally, the moving direction of the image support).

In the present embodiment, the adjustment mechanism to obviate the scanning-speed non-uniformity is arranged at the supporting portions of the third reflection mirrors 74, 76, 78, and 80 on the respective optical paths.

A description will be given of this adjustment mechanism by taking the case of the third reflection mirror 74 as a typical example.

Figure 6A:
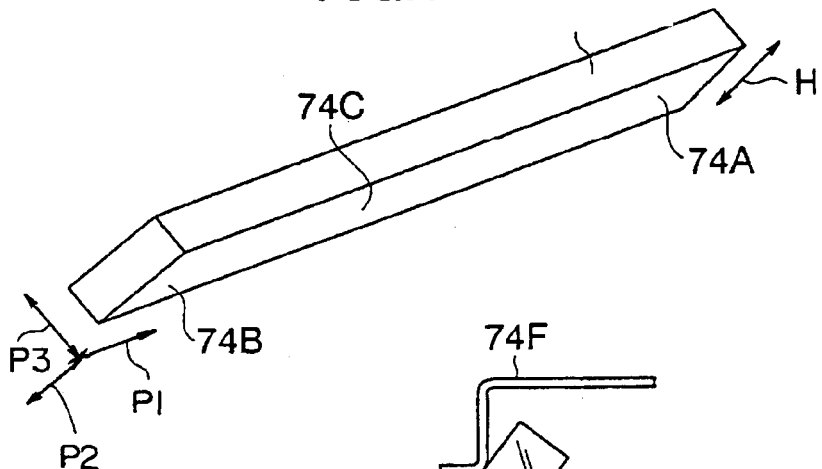
FIG. 6A, FIG. 6B and FIG. 6C are diagrams showing an adjustment mechanism of a third reflection mirror.
Figure 6B:
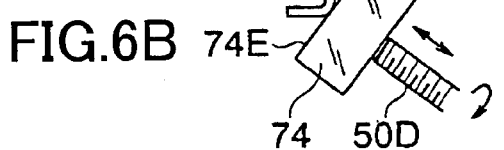
Figure 6C:
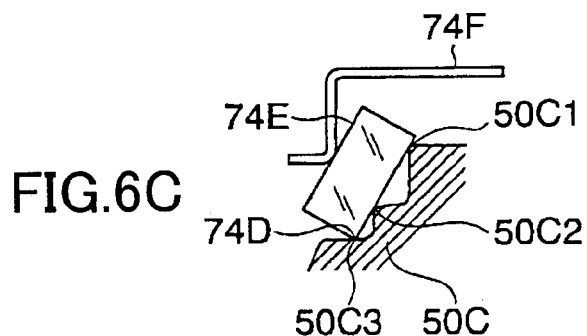

FIG. 6A through FIG. 6C are diagrams showing the adjustment mechanism of the third reflection mirror 74.

As shown in FIG. 6A, the third reflection mirror 74 includes a fixed end 74A, a movable end 74B, and a reflection surface (mirror surface) 74C. The third reflection mirror 74 is movably supported in the optical scanner and rotatable about the fixed end 74A such that the movable end 74B is movable in a direction (the direction of the arrow P3 in FIG. 6A) perpendicular to the reflection surface 74C and the fixed end 74A acts as the supporting point of such rotation.

This makes it possible to change a distance between the light source unit 52 and the scanned surface of the photoconductive drum 1, and thereby it is possible to adjust the non-uniformity of the scanning speed in the main scanning direction.

As shown in FIG. 6C, the fixed end 74A of the third reflection mirror 74 is supported at three points 50C1, 50C2 and 50C3 by the supporting portion 50C, which is arranged in the housing 50, using an elastic actuation force of an elastic member 74F which compresses the backsurface 74E of the mirror 74. The two supporting points 50C1 and 50C2 are separated from each other in the direction of the width H of the mirror 74, and they specify the position (angle) of the reflection surface 74C in the width direction of the mirror 74. Moreover, the corner 74D of the side surface of the mirror 74 is supported by the other supporting point 50C3.

As shown in FIG. 6B, the movable end 74B of the third reflection mirror 74 is adjustably held between a feed screw SOD and the elastic member 74F. The position of the movable end 74B of the third reflection mirror 74 in the directions of approaching or going away from the photoconductive drum 1 can be adjusted by rotating the feed screw 50D and using the fixed end 74A as the supporting point.

The feed screw 50D is provided by making its leading edge contact the reflection surface 74C of the reflection mirror 74 with the base side thereof being bolted to the housing 50. By rotating the feed screw 50D, the above-described adjustment of the non-uniformity of the scanning speed in the main scanning direction can be carried out.

In the present embodiment, the optical scanner is configured so that the rotation of the feed screw 50D is performed manually.

These adjustment mechanisms are also arranged in the other third reflection mirrors 76, 78, and 80, respectively, and the above-mentioned adjustment is performed about the light beam of each color which is used in the optical writing of each photoconductive drum.

By using the feed screw 50D, it is possible to adjust the angle of the third reflection mirrors 74, 76, 78, and 80, which allows the adjustment of the scanning-speed non-uniformity of each color into the ideal condition.

In the case of the actual adjustment, the positional-information measuring device (including the photodiodes PD1–PD3) is arranged at the location (the back surface of the third reflection mirror) near the image support position on the optical paths of the light beams L1, L2, L3, and L4, and the amount of deviation from the ideal position is measured by using the positional-information measuring device.

Figure 7:
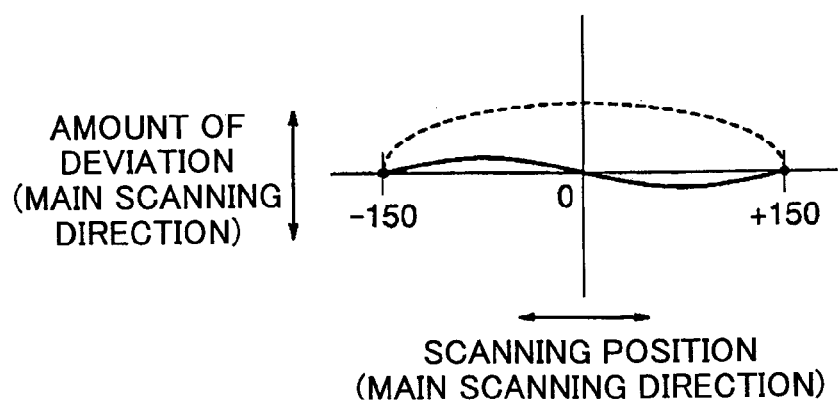
FIG. 7 is a diagram for explaining the relationship between the scanning position in the main scanning direction and the amount of deviation in the main scanning direction.

The dashed line in FIG. 7 indicates the plots of the amount of deviation from the ideal position. By rotating the feed screw SOD, the actual adjustment of each of the third reflection mirrors 74, 76, 78, and 80 is carried out with the fixed end 74A used as the supporting point. The solid line in FIG. 7 indicates the state near the ideal state as the result of the actual adjustment.

However, the scanning line inclination is shifted from the ideal state in many cases in which the scanning speed is changed into the uniform state in this way. This is because the component parts of the optical scanner have variations of optical characteristics and positional precision which cause the deviation from the ideal state.

To eliminate the problem, it is necessary to use the scanning inclination adjustment mechanism, so that the adjustment to bring the scanning line inclination close to the ideal state is performed in addition to the adjustment of the scanning-speed non-uniformity in the main scanning direction.

In the present embodiment, the adjustment mechanism to obviate the scanning line inclination is arranged at the second focusing lenses 69, 70, 71, and 72 which include the wide toroidal lens (WTL) with the power (function) to correct the position of the scanning line in the sub-scanning direction.

A description will be given of this adjustment mechanism by taking the case of the second focusing lens 69 as a typical example.

Figure 8A:
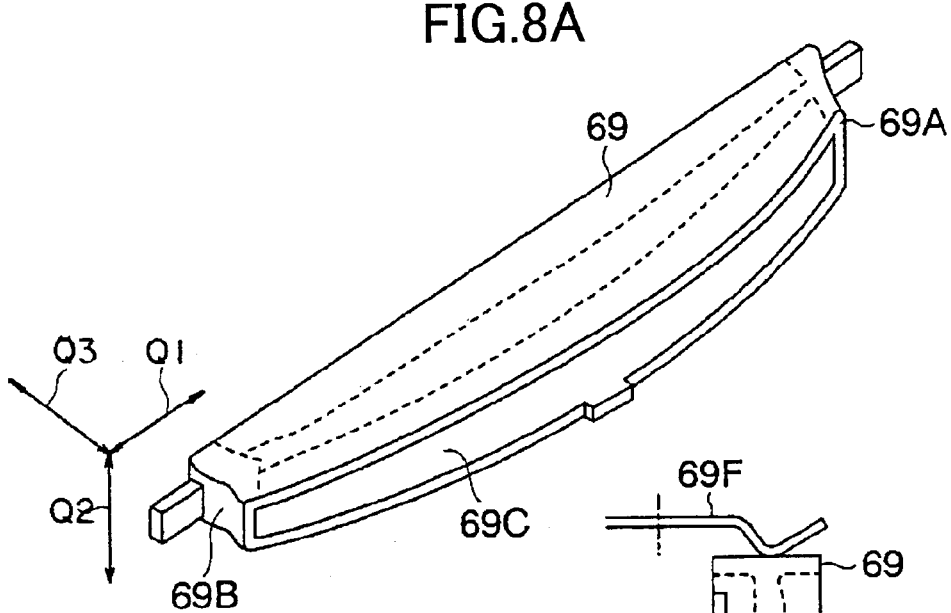
FIG. 8A, FIG. 8B and FIG. 8C are diagrams showing an adjustment mechanism of a second focusing lens.
Figure 8B:
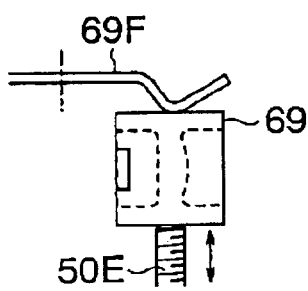
Figure 8C:
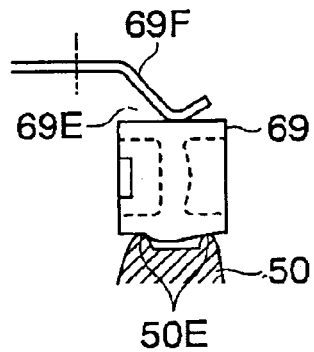

FIG. 8A through FIG. 8C are diagrams showing the adjustment mechanism of the second focusing lens 69.

As shown in FIG. 8A, the second focusing lens 69 includes a fixed end 69A, a movable end 69B, and a lens surface 69C. The second focusing lens 69 is movably supported in the optical scanner and rotatable about the fixed end 69A such that the movable end 69B is movable in a direction (the direction of the arrow Q2 in FIG. 8A) parallel to the lens surface 69C and parallel to the sub-scanning direction and the fixed end 69A acts as the supporting point of such rotation.

This makes it possible to adjust an inclination of the scanning line in the sub-scanning direction.

As shown in FIG. 8C, the fixed end 69A of the second focusing lens 69 is supported at two points by the supporting portion 50E, which is arranged in the housing 50, by using an elastic actuation force of an elastic member 69F which compresses the top surface 69E of the lens 69.

As shown in FIG. 8B, the movable end 69B of the second focusing lens 69 is adjustably held between a feed screw 50E and the elastic member 69F. The position of the movable end 69B of the second focusing lens 69 in the directions (Q2) parallel to the lens surface 69C and parallel to the sub-scanning direction can be adjusted by rotating the feed screw 50E and using the fixed end 69A as the supporting point.

The feed screw 50E is provided by making its leading edge contact the back surface (opposite to the top surface where the elastic member 69F contacts) of the second focusing lens 69 with the base side thereof bolted to the housing 50. By rotating the feed screw 50E, the above-described adjustment of the scanning-line inclination in the sub-scanning direction can be carried out.

In the present embodiment, the optical scanner is configured so that the rotation of the feed screw 50E is driven by a stepping motor (not shown). The stepping motor in the present embodiment is used as an electrically driven actuator.

These adjustment mechanisms are arranged in the other second focusing lenses 70, 71, and 72, in addition to the second focusing lens 69, respectively, and the above-mentioned adjustment is performed about the light beam of each color which is used in the optical writing of each photoconductive drum.

By using the feed screw 50E, it is possible to adjust the angle of the second focusing lenses 69, 70, 71, and 72, which allows the adjustment of the scanning-line inclination of each color into the ideal condition.

In the case of the actual adjustment, the positional-information measuring device is arranged at the above-described location, and the amount of deviation from the ideal position is measured by using the positional-information measuring device.

Figure 9:
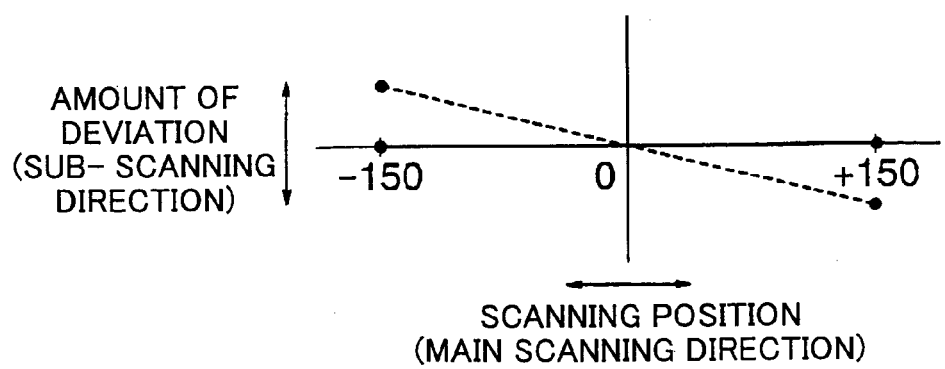
FIG. 9 is a diagram for explaining the relationship between the scanning position in the main scanning direction and the amount of deviation in the sub-scanning direction.

The dashed line in FIG. 9 indicates the plots of the amount of deviation from the ideal position. By rotating the feed screw 50E, the actual adjustment of each of the second focusing lenses 69, 70, 71, and 72 is carried with the fixed end 69A used as the supporting point. The solid line in FIG. 9 indicates the state near the ideal state as the result of the actual adjustment.

In the above-described embodiment, the feed screw 50E of the adjustment mechanism is rotated by driving the stepping motor in order to carry out the adjustment of the scanning-line inclination. Similarly, the feed screw 50D in the scanning-speed uniformity adjustment mechanism may be rotated in order to carry out the adjustment of the scanning-speed non-uniformity, by using a stepping motor, an adjuster, or an electrically driven actuator, instead of the manual operation.

The amount of adjustment can be easily set up with the stepping motor by the number of steps and the pitch of the screw, and the stepping motor is suitable for the control of this kind.

In a case in which the required amount of adjustment is very small, a piezoelectric element etc. may be used instead.

The use of electrically driven actuators in the adjustment mechanisms of the optical scanner according to the present invention will allow easy adjustment operation.

In the above-described embodiment, the third reflection mirror 74 of FIG. 6A has the reflection surface 74C, a first axis (P1) parallel to the main scanning correspondence direction on the reflection surface 74C, and a second axis (P2) along the reflection surface 74C and perpendicular to the first axis (P1). The feed screw 50D is provided to rotate the third reflection mirror 74 around the second axis (P2) in order to attain uniformity of the scanning speed of the optical scanner in the main scanning direction.

The position of the movable end 74B of the third reflection mirror 74 in the directions of approaching or going away from the image support 1 (the direction of the arrow P3) can be adjusted by rotating the feed screw 50D and using the fixed end 74A as the supporting point.

In the above-described embodiment, the second focusing lens 69 of FIG. 8 has the beam-incidence surface (the lens surface 69C), a third axis (Q1) parallel to the main scanning correspondence direction on the beam-incidence surface 69C, and a fourth axis (Q3) perpendicular to the third axis (Q1) and along the beam-incidence direction. The feed screw 50E is provided to rotate the second focusing lens 69 around the fourth axis (Q3) in order to correct the inclination of the scanning line in the sub-scanning correspondence direction to a desired position of the scanning line.

The position of the movable end 69B of the second focusing lens 69 in the directions (Q2) parallel to the lens surface 69C and parallel to the sub-scanning correspondence direction can be adjusted by rotating the feed screw SOE and using the fixed end 69A as the supporting point.

Figure 10:
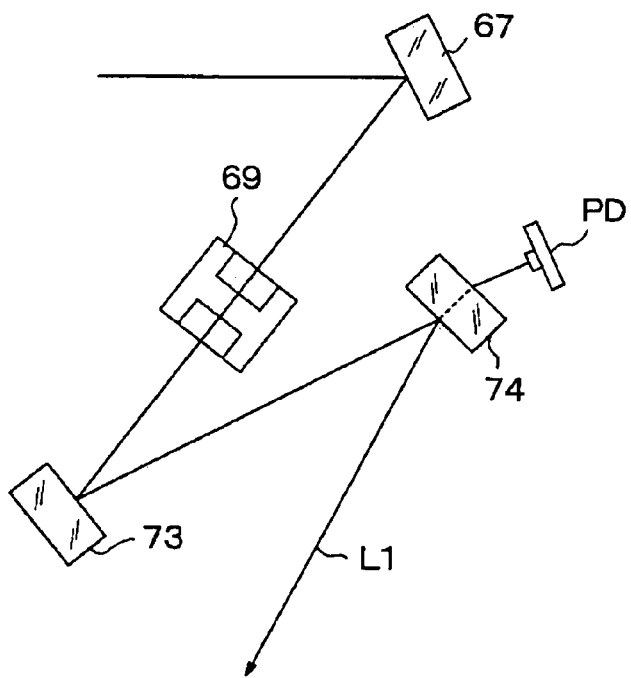
FIG. 10 is a diagram showing the outline composition of a positional-information measuring device.
Figure 11:
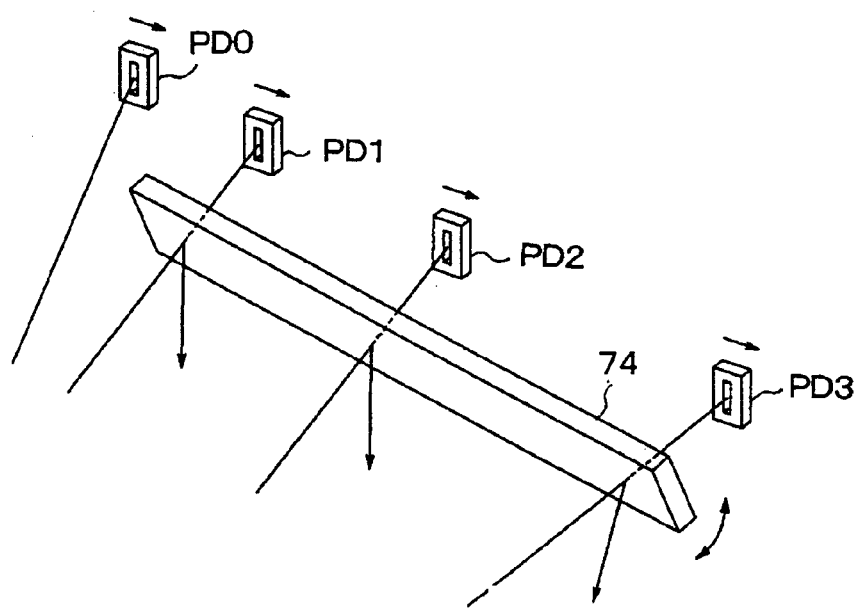
FIG. 11 is a diagram showing the arrangement of photodiodes of the positional-information measuring device.

FIG. 10 shows the outline composition of an example of the positional-information measuring device described above. FIG. 11 shows the arrangement of the photodiodes in the positional-information measuring device.

In this example, half mirrors are used for the third reflection mirrors 74, 76, 78, and 80 (the third reflection mirror 74 is taken as a typical example) which are provided as the final-stage reflection mirrors, and the photodiodes PD1, PD2, and PD3 are arranged on the reverse side (the transparency side) of the mirror 74.

As shown in FIG. 11, the photodiode PD0 is provided for synchronization of the scanning start timing, and the three photodiodes PD1, PD2, and PD3 are arranged within the image-formation area separately from the photodiode PD0.

In the positional-information measuring device, the positions of the photodiodes PD1, PD2, and PD3 correspond to the center and both ends of the image formation area mostly, and the arrangement of these photodiodes does not need high precision.

Figure 12:
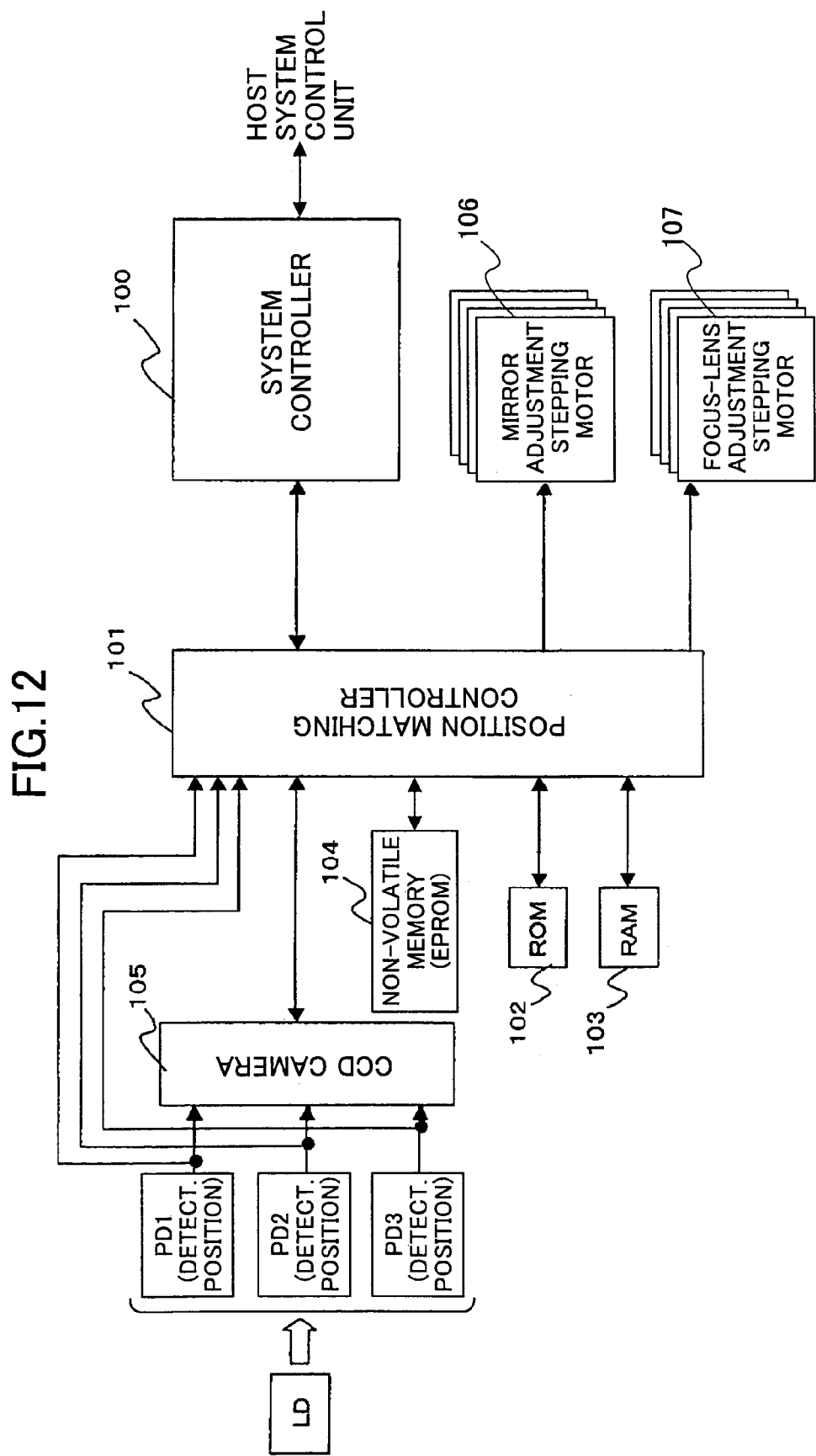
FIG. 12 is a block diagram of a position matching controller of the positional-information measuring device.
Figure 13A:
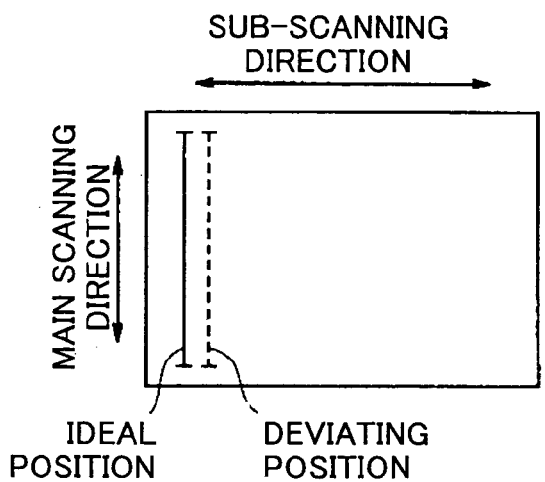
FIG. 13A through FIG. 13F are diagrams for explaining several deviating conditions of the optical scanner which may take place in various image forming apparatuses.
Figure 13B:
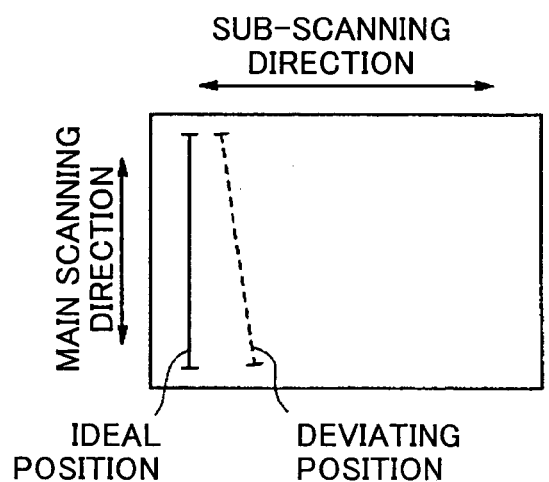
Figure 13C:
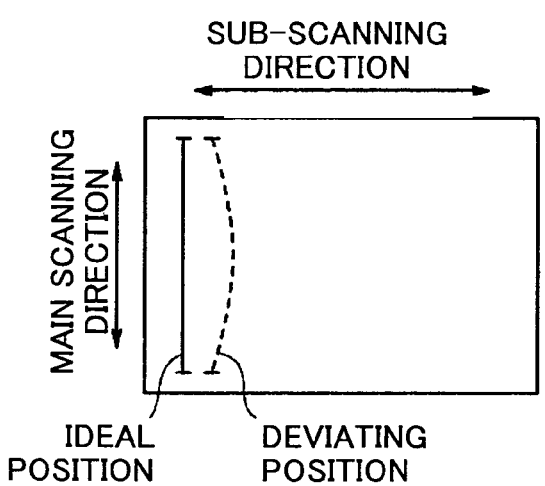
Figure 13D:
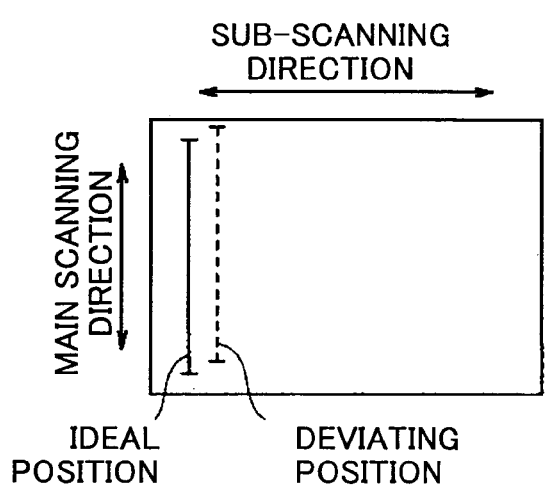
Figure 13E:
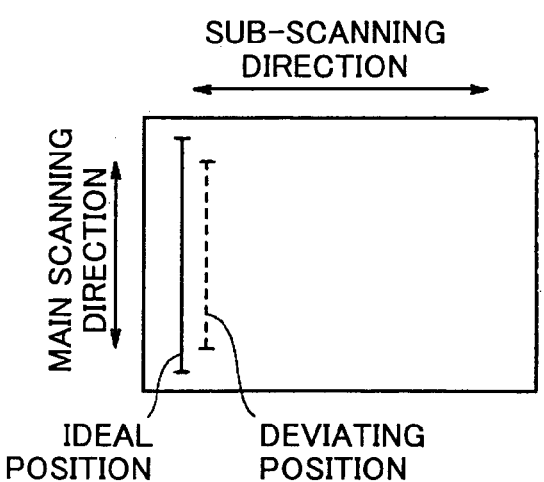
Figure 13F:
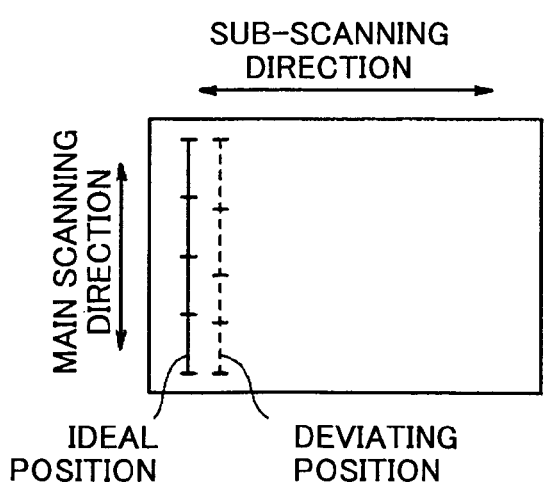

FIG. 12 shows a position matching controller 101 in the positional-information measuring device. The controller 101 is provided for electric adjustment of the third reflection mirrors 74, 76, 78, and 80 and the second focusing lenses 69, 70, 71, and 72 when the positional-information measuring device is used.

The control circuit of the positional-information measuring device includes the system controller 100 and the position matching controller 101, and the system controller 100 controls the operation of the entire optical scanner 5. The system controller 10 and the control unit of the image forming apparatus (the host system) carry out transmission and reception of control information exchanged between them. The position matching controller 101 and the system controller 100 carry out transmission and reception of control information exchanged between them.

The ROM 102, the RAM 103, and the non-volatile memory 104 are connected to the position matching controller 101. Further, the stepping motors 106 provided for the adjustment of the third reflection mirrors 74, 76, 78, and 79, and the stepping motors 107 provided for the adjustment of the second focusing lenses 69, 70, 71, and 72 are connected to the position matching controller 101.

Moreover, the CCD camera 105 is connected to the position matching controller 101. The CCD camera 105 is provided for measurement of the position of the light beam irradiated by the optical scanner. The images which are taken by the CCD camera 101 based on the output signals of the photodiodes PD1, PD2 and PD3 when the passing of the laser beam emitted by the laser diode LD is detected at the respective positions of the photodiodes are captured by the position matching controller 101.

In addition, the CPU of the position matching controller 100 performs the control processing in accordance with the program read out from the ROM 102. The RAM 103 serves as work areas of the CPU during execution of the program, and the data required for the control processing is stored in the RAM 103.

When the optical scanner 5 is assembled, the photodiodes PD0, PD1, PD2, and PD3 are used for the measurement of the position of the laser beam irradiated by the optical scanner 5. Specifically, when the optical scanner 5 is attached to the main part of the image forming apparatus, the CCD camera 105 is arranged as the irradiation position measuring device at the location equivalent to the position of the photoconductive drum in the image forming apparatus.

The position of the irradiation position measurement CCD camera 105 is measured in the main scanning direction, and the CCD camera 105 is positioned precisely.

The LD is turned on to form one dot, after the photodiode PD0 is passed, for the synchronization in the pulse number in which the distances of the photodiodes PD1, PD2 and PD3 become the same (the distance of the center and one end (PD1 and PD2) and the distance of the center and the other end (PD3 and PD2) become the same). At that time, an image is taken by the CCD camera 105 based on the output signals of the photodiodes PD1, PD2 and PD3, and the image information is inputted into the position matching controller 101.

The position matching controller 101 supplies the driving pulses to the stepping motors 106 which rotate the feed screws 50D for the angle adjustment of the third reflection mirrors 74, 76, 78, and 80, and the above-mentioned adjustment is carried out around the P2 axis of the mirror concerned. The scanning-speed non-uniformity is adjusted such that the distance of the center and one end (PD1 and PD2) and the distance of the center and the other end (PD3 and PD2) become the same.

Thereafter, the position matching controller 101 supplies the driving pulses to the stepping motors 107 which rotate the feed screws 50E for the angle adjustment of the second focusing lenses (including the wide toroidal lenses) 69, 70, 71, and 72, and the above-mentioned adjustment is carried out around the Q3 axis of the lens concerned.

Such adjustment is performed, the feed position is measured by the CCD camera 105, and the amount of deviation is adjusted to zero. This adjustment is repeated two or more times until the amount of deviation becomes zero. The scanning position after the adjustment is also measured in that case. After the irradiation position measurement is finished, the CCD camera 105 is removed from the optical scanner 5.

Then, the LD is turned on continuously, and the time of the detection between PD0 and PD1, the time of the detection between PD0 and PD2, and the time of the detection between PD0 and PD3 are measured. From the results of the time measurement (PD0–PD1, PD0–PD2, and PD0–PD3) and the timing measurement when the LD is turned on by one dot by using the CCD camera 105, the positional information of PD1–PD3 is determined and stored in the non-volatile memory 104 as the data of the distance and time.

And the data of the distance and time stored is used at the time of positioning the optical scanner 5 after the installation of the optical scanner 5 in the main part of the image forming apparatus.

In the above-described embodiment, the adjustment mechanism is provided for each color of black, cyan, magenta, and yellow. However, if the reference color is predetermined, the adjustment mechanism for the reference color may be omitted, and it is adequate that the adjustment mechanisms are provided for only the other three colors. For example, if the reference optical path is used for black, the scanning-speed uniformity adjustment mechanism and the scanning line inclination adjustment mechanism for the optical path L1 of black may be omitted. In the actual adjustment, it does not bring close to each ideal state, but the state of the black optical path L1 is adjusted to the target about the scanning-speed uniformity and the scanning line inclination of the optical paths L2, L3, and L4 which are used in the other colors.

If it is the optical scanner for color image forming apparatuses of the picture hundreds of micron level is sufficient as whose position absolutely in that case, since the relative position deviation of each color scanning line can be brought close to zero, it will not lower the quality as a color picture.

Moreover, it is desirable to carry out adjustment of the scanning-speed non-uniformity first and perform adjustment of the scanning line inclination next. The scanning line inclination changes when the scanning-speed uniformity adjustment is carried out. If the latter is performed after the former is performed, it is necessary to carry out the scanning line inclination adjustment again, and the resulting adjustment convergency becomes poor.

In the above-described embodiment, the plurality of light beams L1–L4 are used in the optical scanner 5. The same concept of the above-described embodiment is also applicable to the optical scanner in which the single light beam is used. Therefore, the present invention can be applied irrespective of the number of the optical paths of the light beams.

Moreover, the scanning-speed non-uniformity can be adjusted with high precision and good absolute position precision can be provided for the optical scanner of the single optical path. Furthermore, for the optical scanner of the multiple optical paths, good scanning-speed uniformity and good absolute position precision can be provided for each optical path.

In addition, the adjustment mechanism in the present embodiment should be taken as a typical example, and the present invention is applicable to any adjustment mechanism which moves an optical element around its axis.

Furthermore, in the present embodiment, the third reflection mirror is taken as a typical example for the adjustment, and the present invention is applicable also to the first and second reflection mirrors. However, the adjustment width in the latter case is expanded, and the difficulty of adjustment cannot be denied.

The present invention is not limited to the above-described embodiments, and variations and modifications may be made without departing from the scope of the present invention.

Further, the present invention is based on Japanese priority application No. 2002-273785, filed on Sep. 19, 2002, the entire contents of which are hereby incorporated by reference.

What is claimed is:

1. An optical scanner which irradiates a light beam to a scanned surface of an image support to form an electrostatic latent image on the image support surface, comprising:
   a light source emitting a light beam;
   at least one final-stage reflection mirror having a reflection surface which reflects a reflected light beam from a polygon mirror directly to the scanned surface of the image support, a first axis parallel to a main-scanning correspondence direction on the reflection surface, and a second axis along the reflection surface and perpendicular to the first axis;

an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction;

a first adjustment unit provided to rotate said at least one final-stage reflection mirror around the second axis in order to attain uniformity of a scanning speed of the optical scanner in the main scanning direction;

a second adjustment unit provided to rotate said optical element around the fourth axis in order to correct an inclination of the scanning line in the sub-scanning correspondence direction to a desired position of the scanning line, at least one of the first adjustment unit and the second adjustment unit being provided with an electrically driven actuator;

a detection unit detecting an error of the scanning speed of the optical scanner; and a control unit controlling driving of the actuator based on the scanning speed error detected by the detection unit, wherein said at least one final-stage reflection mirror is a half mirror, and the detection unit detects the error of the scanning speed based on a difference of detection times of the light beam detected by a plurality of photodetectors, said plurality of photodetectors being arranged on a back surface of the half mirror apart from one another at a given interval.

2. The optical scanner of claim 1 wherein the first adjustment unit comprises a feed screw provided to move said at least one final-stage reflection mirror against an elastic actuation force of an elastic member that compresses said at least one final-stage reflection mirror toward the first adjustment unit.

3. The optical scanner of claim 1 wherein the second adjustment unit comprises a feed screw provided to move the optical element against an elastic actuation force of an elastic member that compresses the optical element toward the second adjustment unit.

4. The optical scanner of claim 3 wherein the feed screw of the second adjustment unit is rotated by an electrically driven actuator.

5. The optical scanner of claim 1 wherein a plurality of image supports are provided, and the first adjustment unit and the second adjustment unit are provided respectively for each of the plurality of image supports in an optical path where optical writing of each image support is carried out by the optical scanner.

6. The optical scanner of claim 1 wherein a plurality of image supports are provided, one of the plurality of image supports includes a reference optical path, and the first adjustment unit and the second adjustment unit are provided respectively for each of the remaining image supports other than said one of the plurality of image supports in an optical path where optical writing is carried out by the optical scanner.

7. An optical scanner which irradiates a light beam to a scanned surface of an image support to form an electrostatic latent image on the image support surface, comprising:

a light source emitting a light beam;

at least one final-stage reflection mirror having a reflection surface which reflects a reflected light beam from a polygon mirror directly to the scanned surface of the image support;

an optical element adjusting a position of a scanning line in a sub-scanning correspondence direction, the optical element having a beam-incidence surface, a first axis parallel to the main-scanning correspondence direction on the beam-incidence surface, and a second axis perpendicular to the first axis and along a beam-incidence direction;

a first supporting unit supporting a portion of said at least one final-stage reflection mirror;

a first adjustment unit provided to rotate said at least one final-stage reflection mirror about the first supporting unit in a direction perpendicular to the reflection surface and change a distance between the reflection surface and the image support surface in order to attain uniformity of a scanning speed of the optical scanner in the main scanning direction;

a second supporting unit supporting a portion of said optical element;

a second adjustment unit provided to rotate said optical element about the second supporting unit in the sub-scanning correspondence direction in order to correct an inclination of the scanning line in the sub-scanning correspondence direction to a desired position of the scanning line, at least one of the first adjustment unit and the second adjustment unit being provided with an electrically driven actuator;

a detection unit detecting an error of the scanning speed of the optical scanner; and a control unit controlling driving of the actuator based on the scanning speed error detected by the detection unit, wherein said at least one final-stage reflection mirror is a half mirror, and the detection unit detects the error of the scanning speed based on a difference of detection times of the light beam detected by a plurality of photodetectors, said plurality of photodetectors being arranged on aback surface of the half mirror apart from one another at a given interval.

8. The optical scanner of claim 7 wherein the first supporting unit is provided at a first end of said at least one final-stage reflection mirror in the main-scanning correspondence direction outside a scanning range of said at least one final-stage reflection mirror, and the first adjustment unit is provided at a second end of said at least one final-stage reflection mirror in the main-scanning correspondence direction outside the scanning range of said at least one final-stage reflection mirror.

9. The optical scanner of claim 7 wherein the second supporting unit is provided at a first end of the optical element in the main-scanning correspondence direction, and the second adjustment unit is provided at a second end of the optical element in the main-scanning correspondence direction.

10. An optical-path adjustment method for an optical scanner which irradiates a light beam to a scanned surface of an image support to form an electrostatic latent image on the image support surface, the optical scanner including:

a light source emitting a light beam;

at least one final-stage reflection mirror having a reflection surface which reflects a reflected light beam from a polygon mirror directly to the scanned surface of the image support, a first axis parallel to a main-scanning correspondence direction on the reflection surface, and a second axis along the reflection surface and perpendicular to the first axis; and an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction, the method comprising the steps of:

rotating said at least one final-stage reflection mirror around the second axis in order to attain uniformity of a scanning speed of the optical scanner in the main scanning direction; and rotating said optical element around the fourth axis in order to correct an inclination of the scanning line in the sub-scanning correspondence direction to a desired position of the scanning line, wherein the second rotating step is performed after the first rotating step is performed, and said at least one final-stage reflection mirror is a half mirror, and in the first rotating step an error of the scanning speed is detected based on a difference of detection times of the light beam detected by a plurality of photodetectors.

11. The method of claim 10 wherein in the first rotating step a distance between the reflection surface of said at least one final-stage reflection mirror and the image support surface is changed by rotating a feed screw manually, and in the second rotating step an inclination of the optical element in a direction perpendicular to the main-scanning correspondence direction is changed by an electrically driven actuator.

12. The method of claim 10 wherein in the first rotating step the difference of detection times of the light beam detected by the plurality of photodetectors is measured by turning on the light source, the plurality of photodetectors being arranged on a back surface of the half mirror apart from one another at a given interval.

13. The method of claim 12 wherein the distances of the plurality of photodetectors are stored in a memory device and the distances are read from the memory device when detecting the error of the scanning speed.

14. The method of claim 10 wherein the optical scanner comprises a CCD camera configured to record image data at a time based on output signals of the plurality of photodetectors.

15. An optical-path adjustment method for an optical scanner which irradiates a light beam to a scanned surface of an image support to form an electrostatic latent image on the image support surface, the optical scanner including:

a light source emitting a light beam;

at least one final-stage reflection mirror having a reflection surface which reflects a reflected light beam from a polygon mirror directly to the scanned surface of the image support;

an optical element adjusting a position of a scanning line in a sub-scanning correspondence direction, the optical element having a beam-incidence surface, a first axis parallel to the main-scanning correspondence direction on the beam-incidence surface, and a second axis perpendicular to the first axis and along a beam-incidence direction;

a first supporting unit supporting a portion of said at least one final-stage reflection mirror; and a second supporting unit supporting a portion of said optical element, the method comprising the steps of:

rotating said at least one final-stage reflection mirror about the first supporting unit in a direction perpendicular to the reflection surface and changing a distance between the reflection surface and the image support surface in order to attain uniformity of a scanning speed of the optical scanner in the main scanning direction; and rotating said optical element about the second supporting unit in the sub-scanning correspondence direction in order to correct an inclination of the scanning line in the sub-scanning correspondence direction to a desired position of the scanning line, wherein the second rotating step is performed after the first rotating step is performed, and said at least one final-stage reflection mirror is a half mirror, and in the first rotating step an error of the scanning speed is detected based on a difference of detection times of the light beam detected by a plurality of photodetectors.

16. An image forming apparatus comprising:

an optical scanner which irradiates a light beam to a scanned surface of an image support to form an electrostatic latent image on the image support surface; and an image formation unit forming an image on a recording material based on the electrostatic latent image formed on the image support surface, the optical scanner comprising:

a light source emitting a light beam;

at least one final-stage reflection mirror having a reflection surface which reflects a reflected light beam from a polygon mirror directly to the scanned surface of the image support, a first axis parallel to a main-scanning correspondence direction on the reflection surface, and a second axis along the reflection surface and perpendicular to the first axis;

an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction;

a first adjustment unit provided to rotate said at least one final-stage reflection mirror around the second axis in order to attain uniformity of a scanning speed of the optical scanner in the main scanning direction; and a second adjustment unit provided to rotate said optical element around the fourth axis in order to correct an inclination of the scanning line in the sub-scanning correspondence direction to a desired position of the scanning line, at least one of the first adjustment unit and the second adjustment unit being provided with an electrically driven actuator;

a detection unit detecting an error of the scanning speed of the optical scanner; and a control unit controlling driving of the actuator based on the scanning speed error detected by the detection unit, wherein said at least one final-stage reflection mirror is a half mirror, and the detection unit detects the error of the scanning speed based on a difference of detection times of the light beam detected by a plurality of photodetectors, said plurality of photodetectors being arranged on a back surface of the half mirror apart from one another at a given interval.

17. An optical scanner which irradiates a light beam to a scanned surface of an image support to form an electrostatic latent image on the image support surface, the optical scanner comprising:

a light source emitting a light beam;

at least one final-stage reflection mirror having a reflection surface which reflects a reflected light beam from a polygon mirror directly to the scanned surface of the image support, a first axis parallel to a main-scanning correspondence direction on the reflection surface, and a second axis along the reflection surface and perpendicular to the first axis;

an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction;

first adjustment means for rotating said at least one final-stage reflection mirror around the second axis in order to attain uniformity of a scanning speed of the optical scanner in the main scanning direction; and second adjustment means for rotating said optical element around the fourth axis in order to correct an inclination of the scanning line in the sub-scanning correspondence direction to a desired position of the scanning line, at least one of the first adjustment means and the second adjustment means being provided with an electrically driven actuator;

detection means for detecting an error of the scanning speed of the optical scanner: and control means for controlling driving of the actuator based on the scanning speed error detected by the detection means, wherein said at least one final-stage reflection mirror is a half mirror, and the detection means detects the error of the scanning speed based on a difference of detection times of the light beam detected by a plurality of photodetectors, said plurality of photodetectors being arranged on a back surface of the half mirror apart from one another at a given interval.

18. An optical scanner which irradiates a light beam to a scanned surface of an image support to form an electrostatic latent image on the image support surface, the optical scanner comprising:

a light source emitting a light beam;

at least one final-stage reflection mirror having a reflection surface which reflects a reflected light beam from a polygon mirror directly to the scanned surface of the image support;

an optical element adjusting a position of a scanning line in a sub-scanning correspondence direction, the optical element having a beam-incidence surface, a first axis parallel to the main-scanning correspondence direction on the beam-incidence surface, and a second axis perpendicular to the first axis and along a beam-incidence direction;

first supporting means for supporting a portion of said at least one final-stage reflection mirror;

first adjustment means for rotating said at least one final-stage reflection mirror about the first supporting unit in a direction perpendicular to the reflection surface and changing a distance between the reflection surface and the image support surface in order to attain uniformity of a scanning speed of the optical scanner in the main scanning direction;

second supporting means for supporting a portion of said optical element; and second adjustment means for rotating said optical element about the second supporting unit in the sub-scanning correspondence direction in order to correct an inclination of the scanning line in the sub-scanning correspondence direction to a desired position of the scanning line, at least one of the first adjustment means and the second adjustment means being provided with an electrically driven actuator;

detection means for detecting an error of the scanning speed of the optical scanner; and control means for controlling driving of the actuator based on the scanning speed error detected by the detection means, wherein said at least one final-stage reflection mirror is a half mirror, and the detection means detects the error of the scanning speed based on a difference of detection times of the light beam detected by a plurality of photodetectors, said plurality of photodetectors being arranged on a back surface of the half mirror apart from one another at a given interval.

19. An image forming apparatus comprising:

an optical scanner which irradiates a light beam to a scanned surface of an image support to form an electrostatic latent image on the image support surface; and an image formation unit forming an image on a recording material based on the electrostatic latent image formed on the image support surface, the optical scanner comprising:

a light source emitting a light beam;

at least one final-stage reflection mirror having a reflection surface which reflects a reflected light beam from a polygon mirror directly to the scanned surface of the image support, a first axis parallel to a main-scanning correspondence direction on the reflection surface, and a second axis along the reflection surface and perpendicular to the first axis;

an optical element adjusting a position of a scanning line in a sub-scanning correspondence direction, the optical element having a beam-incidence surface, a third axis parallel to the main-scanning correspondence direction on the beam-incidence surface, and a fourth axis perpendicular to the third axis and along a beam-incidence direction;

first adjustment means for rotating said at least one final-stage reflection mirror around the second axis in order to attain uniformity of a scanning speed of the optical scanner in the main scanning direction; and second adjustment means for rotating said optical element around the fourth axis in order to correct an inclination of the scanning line in the sub-scanning correspondence direction to a desired position of the scanning line, at least one of the first adjustment means and the second adjustment means being provided with an electrically driven actuator;

detection means for detecting an error of the scanning speed of the optical scanner; and control means for controlling driving of the actuator based on the scanning speed error detected by the detection means, wherein said at least one final-stage reflection mirror is a half mirror, and the detection means detects the error of the scanning speed based on a difference of detection times of the light beam detected by a plurality of photodetectors, said plurality of photodetectors being arranged on a back surface of the half mirror apart from one another at a given interval.

* * * * *